United States Patent
Goldman et al.

(10) Patent No.: US 6,564,371 B1
(45) Date of Patent: May 13, 2003

(54) DUAL SOFTWARE IMAGES WITH FALLBACK

(75) Inventors: Tomasz Goldman, Hellerup (DK); Henrik Uhlemann, Copenhagen (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/383,810

(22) Filed: Aug. 26, 1999

Related U.S. Application Data

(60) Provisional application No. 60/097,914, filed on Aug. 26, 1998.

(51) Int. Cl.[7] .................................................. G06F 9/45
(52) U.S. Cl. ........................................... 717/127; 714/46
(58) Field of Search ........................ 717/11, 127; 714/2, 714/6, 7, 19, 46

(56) References Cited

U.S. PATENT DOCUMENTS

| 4,788,637 | A | | 11/1988 | Tamaru | 709/221 |
|---|---|---|---|---|---|
| 5,627,964 | A | * | 5/1997 | Reynolds et al. | 714/46 |
| 6,167,532 | A | * | 12/2000 | Wisecup | 714/23 |

* cited by examiner

*Primary Examiner*—Kakali Chaki
*Assistant Examiner*—John Q. Chavis
(74) *Attorney, Agent, or Firm*—Fish & Richardson P.C.

(57) ABSTRACT

A method and system to enable a user to store a known and operational version of software and a new version of software (possibly not operational) in a memory on a network device. The user can test the new software and have an automatic fallback mechanism which loads the old version of software in the device if the new version fails to operate.

12 Claims, 7 Drawing Sheets

DUAL SOFTWARE IMAGES WITH FALL-BACK

Priority based on provisional patent application, Serial No. 60/097,914 filed Aug. 26, 1998, entitled "Using Two Software Images With Fall-Back" is claimed.

BACKGROUND OF THE INVENTION

In computer systems, and devices having an embedded processor and software, it may be necessary to try out a new version of software, requiring the user to remove the old version. Users may be reluctant to try the new version of the software because it may not work in a satisfactory manner or it may completely fail to work, resulting in device unavailability or decreased reliability.

When updating a router, bridge, and other system having a software-configured processor, a backup copy of the old version may be stored on a separate computer before establishing a new version. If the new version fails, the old version can be copied from that separate computer to the embedded system. This copying is time consuming and creates the possibility that there may be new user errors in reloading the old software and reconfiguring the system. In addition, this solution may require that the embedded system, with the new version, be at least partially working to restore the old version.

SUMMARY OF THE INVENTION

Various implementations of the invention may include one or more of the following features.

In general, in one aspect, the invention features a method for testing software in a device, including initializing the device, storing at least two software images in a memory in the device, providing status information to indicate the state of each software image in memory and selecting one of the software images for execution depending upon the status information.

Implementations may include one or more of the following features.

In an implementation, selecting one of the software images for execution includes executing the version with status information indicating the image is a test version. Selecting one of the software images for execution includes executing the image with status information indicating the image is a known operational version.

Implementations may also include changing the status information for the selected software image prior to execution from a status indicating that the image is a test version to a status indicating that the image is to be ignored by the device, and associating status information of one other software image in memory which is known to be operational to indicate that the one other image of software is operational, and determining whether the device is operating properly.

Implementations may also include changing the status information of the selected software image from indicating that it is to be ignored to status information that indicates that it is an operational version if the device is operating properly, and changing the status information of the one other software image to a status information indicating that it is to be ignored by the device, maintaining the status information of the selected software image if the device is not operating properly, and reinitializing the device.

In an implementation, the software images and status information are stored in a non-volatile memory, the non-volatile memory comprising a plurality of bit value locations, the bit value locations being independently addressable when changing state between a first state value and a second state value, and the bit value locations being addressable members of an interdependent plurality of locations when changing state between the second state value and the first state value. In addition, changing the status information comprises altering a bit value location between the first state value and the second state value.

In another aspect, the invention features a method in a network device including storing at least two software images in memory, providing status information for each of the software images indicating the operational state of the software images, indicating in the status information of one of the software images that the image is a test image, indicating in the status information in one of the images known to be operational that it is a fallback image, storing the fallback image in a memory in the network device, executing the test image, removing the test image and executing the fallback image if the test image does not operate properly and reinitializing the device. The memory in the network device can be flash memory.

In another aspect, the invention features a method of managing images of software in a device including storing at least two images of software in a memory in the device, storing status records in the memory, wherein the status records indicate the operating mode of the software, selecting one of the images of software to establish device operation depending on the status records.

Implementations may include selecting one of the images of software by altering the status records to indicate an attempt to establish device operation with the selected image of software, and executing the selected image of software.

Implementations may also include reinitializing the device, wherein reinitializing the device comprises detecting a status record designating the selected version as a test image and altering the detected status record to designate the selected image as a rejected version, establishing device operation, indicating whether the operational image of software is to be accepted, and selectively altering any status records necessary to indicate whether the selected version is to be accepted.

In another aspect the invention features a computer program residing on a computer-readable medium comprising instructions for causing a computer to store at least two images of software in a memory in the device, store a status record for each image in the memory, wherein the status records indicate the operating mode of the associated software image, select one of the images of software to establish device operation. Implementations may include instructions to select one of the software images, alter the status records to indicate an attempt to establish device operation with the selected image of software, execute the selected image of software.

Implementations may also include instructions to detect a status record designating the selected image as a test version, to alter the detected status record to designate the selected image as a rejected version, establish device operation, indicate whether the operational image of software is to be accepted and selectively alter status records to indicate whether the selected image is to be accepted.

In yet another aspect, the invention features a processor-based apparatus including a processor, a memory operationally coupled to the processor, the memory storing instructions to: store at least two images of software in a second memory in the apparatus, store status records in the second memory, wherein each status record indicates the operating mode of the associated software image, and select one of the images of software to establish device operation.

Implementations may include, a hard disk and a flash-memory.

The invention may provide one or more of the following advantages.

The systems and techniques described here can enable a user of a network device to store two versions of software the network device. One version of the software is a known and operational version. Another version can be a new version that is not yet known to be operational. The user has to designate the operational version as a fallback version and the new version as a test version. If the new version fails to work or renders the device non-operational and non-responsive, the user simply has to restart the system and the old operation version will be reloaded.

The details of one or more embodiments are set forth in the accompanying drawings and the description below. Other features, objects, and advantages of the invention will be apparent from the description and drawings, and from the claims.

DETAILED DESCRIPTION

Figure 1:
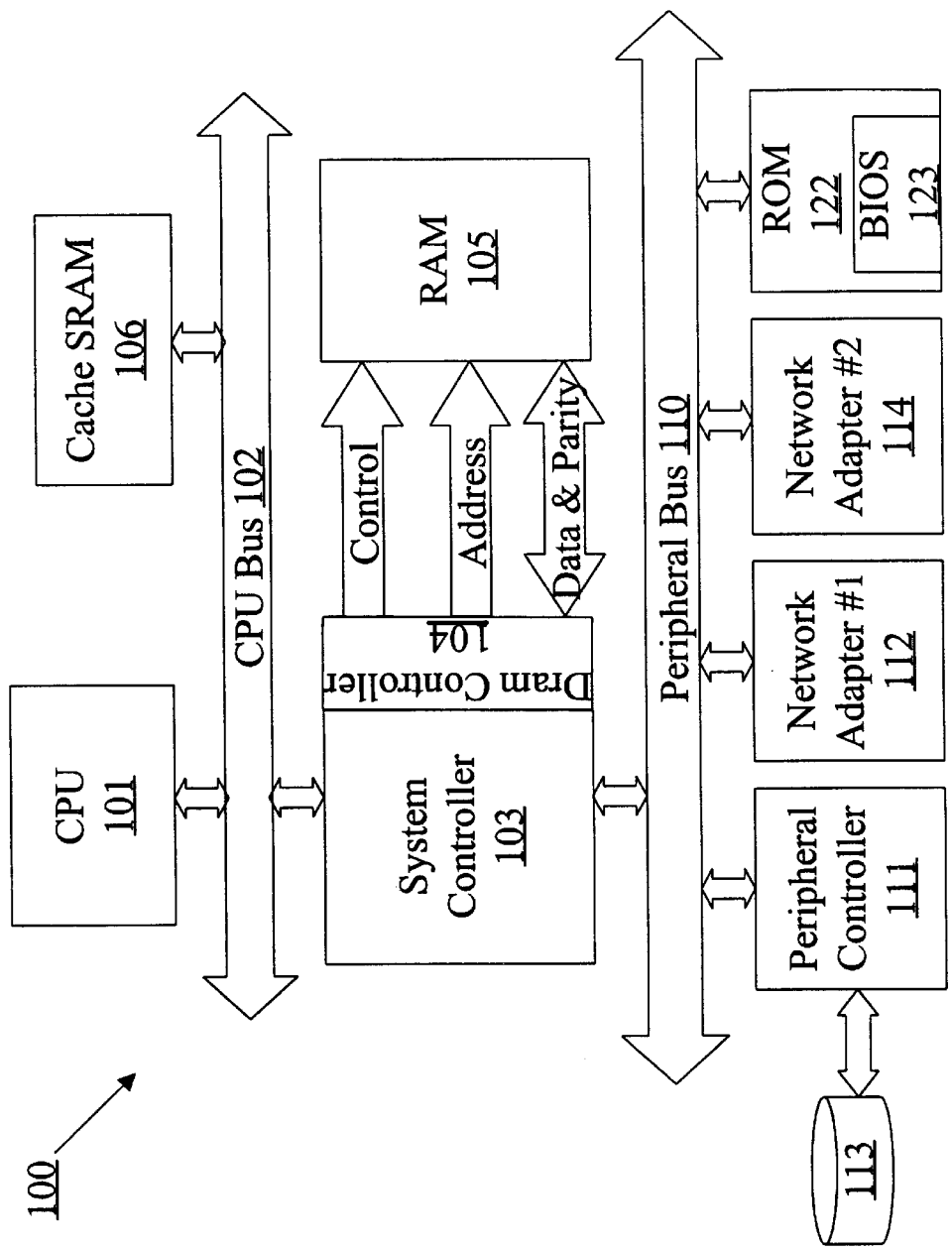
FIG. 1 illustrates a computer system.

FIG. 1 depicts physical resources of an exemplary network device 100. The device 100 has a central processor 101 connected to a processor host bus 102 over which it provides data, address and control signals. The processor 101 can be any conventional general purpose single- or multichip processor such as Pentium processor, a Pentium Pro processor, Pentium II processor, a MIPS processor, a Power PC processor or an ALPHA processor. In addition, the processor 101 may be any conventional special purpose processor such as a digital signal processor or a network communications protocol processor.

The device 100 includes a system controller 103 having an integrated RAM memory controller 104 connected to the host bus 102. The controller 103 provides an interface to random access memory 105. The system controller 103 also provides host bus to peripheral bus bridging functions. The controller 103 thereby permits signals on the processor host bus 102 to be compatibly exchanged with signals on a primary peripheral bus 110. The peripheral bus 110 can be, for example, a Peripheral Component Interconnect (PCI) bus, an Industry Standard Architecture (ISA) bus or Micro-Channel bus, or other bus structure. The device 100 may also include a first network adaptor 112 and a second network adaptor 114 coupled to the peripheral bus 110. The network adapters 112 and 114 may be for example, a modem, Ethernet card, or other network communications device. The device 100 may also include additional peripherals such as a hard disk drive control interface 111 to couple a hard disk 113 to the peripheral bus 110.

The device 100 includes non-volatile ROM memory 122 to store basic computer software routines. ROM 122 can include alterable memory, such as EEPROM (Electronically Erasable Programmable Read only Memory), to store configuration data. ROM 122 can include software to test and initialize device hardware and can include a device operating system, and application software. For example, in bridge, the ROM 122 may include operating system software to control peripheral devices 111–112, 114 and can include network application software to perform transparent or source-routing bridges. In a device 100 implementation having a hard disk drive 113, the ROM can include "boot" routines to load operating system and application software from disk 113.

BIOS routines 123 can be included in ROM 122 and provide basic computer initialization, systems testing, and input/output services. The BIOS 123 also includes routines that allow the operating system 230 (FIG. 2A) to be "booted" from the disk 113 or from a server computer using a local area network connection provided by the network adapter 114. The operating system boot operation can occur after the device 100 is started or restarted, and power-on self-test (POST) routines stored in BIOS 123 complete execution, or when a reset switch is depressed, or following a software-initiated system reset or a software fault, such as if a new version of software is being tested.

Figure 2A:
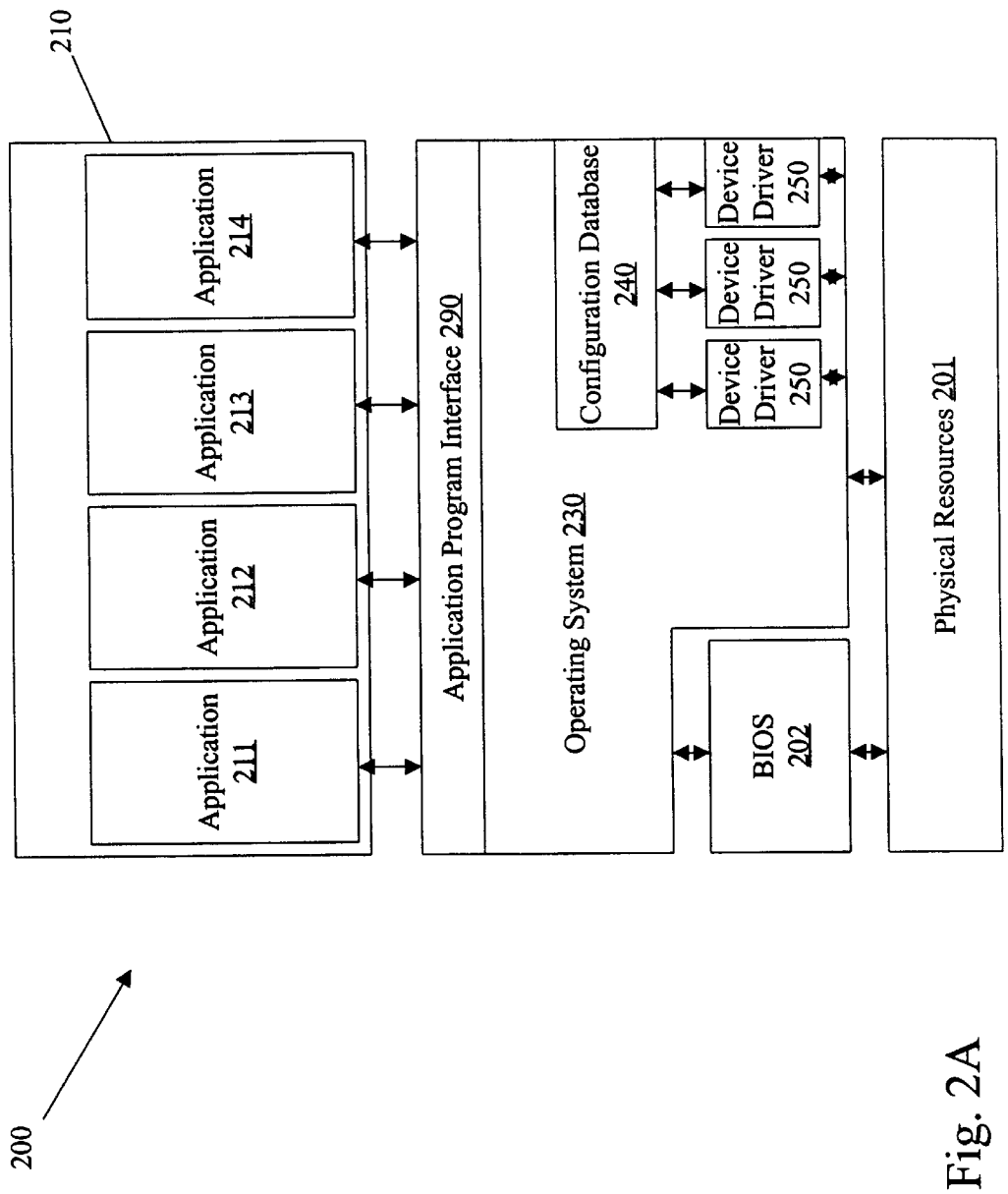
FIG. 2A illustrates a computer system operating environment.
Figure 2B:
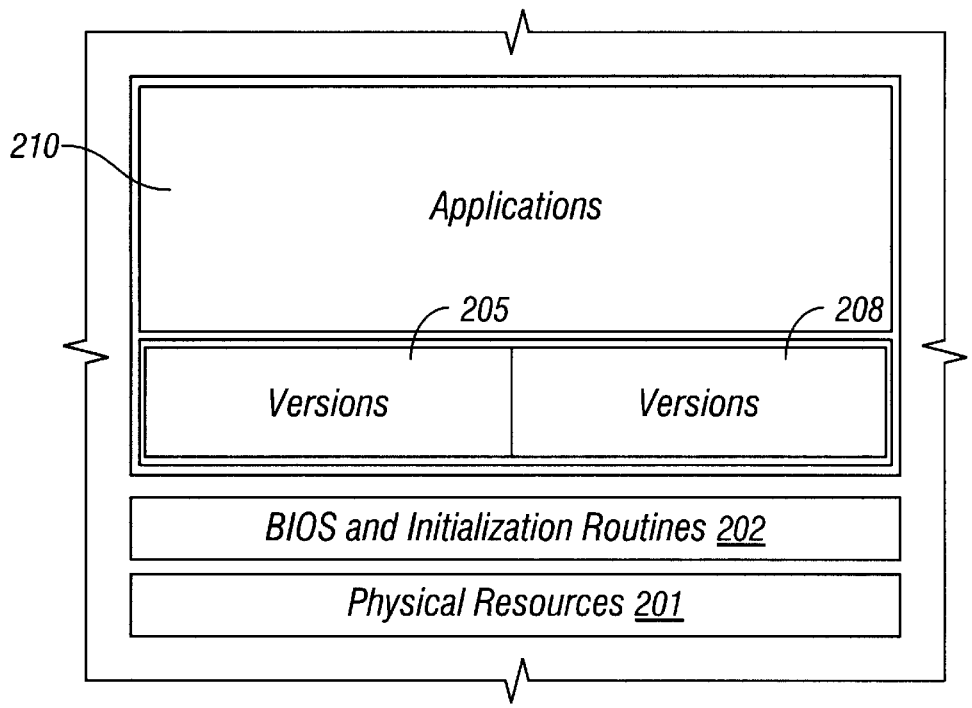
FIG. 2B illustrates a region in memory.

Referring now to FIG. 2A, a computer system operating environment 200 is shown. The environment 200 can include the following software: BIOS 202, operating system 230, and applications 210 that can control and interact with physical resources 201. The physical resources 201 include for example, components 101–106, 110–114, and 122–123 of FIG. 1. The operating system 230 is any of a variety of embedded operating systems such as Unix or a specific proprietary system for embedded devices. The operating system 230 provides software functions to manage, configure, enable, and allocate the various physical resources 201 in a computer. For example, the operating system 230 can include memory allocation algorithms to allocate RAM memory 105 (FIG. 1) among various software tasks. Additionally, the environment 200 includes application program space 210 (FIG. 2B). Application program space 210 includes memory and other physical resources allocated to application processes 211–214. The allocation of physical resources 201 to application processes 211–214 can be managed using operating system 230 functions.

To manage the physical resources 201, the operating system can include one or more device drivers 250. The device drivers provide control functionality specific to a particular physical device or class of devices. Additionally, the device drivers 250 provide standard software interfaces allowing other system 200 components to access the controlled device. For example, device driver 250 may be a network adapter driver. The adapter driver 250 provides standard software interfaces to, for example, an application program interface (API) 290. Applications 211–214, though use of application program interface 290 software functions, can thereby access the device drivers 250 and network adapter 112 (FIG. 1). Device drivers 250 can also provide device-specific control, resource management, initialization, and fault handling for the controlled device. The device 100 can include a configuration data base 240 which stores allocations of interrupts and other physical resources such as Direct Memory Access (DMA) levels which are allocated by the operating system.

Physical resources assignment by the operating system 230 may be determined by the version of the software in use, including the operating system 230 itself or versions of the device driver software 250 or application software 211, 212, 213, 214. The versions may determine what network interface devices are to be in operation, the network protocols to be used, the active features of the network, and the network configuration. For example, a network device may receive a version of the software transferred from the network using Simple Network Management Protocol (SNMP). The version of software that is transferred over the network may depend on the type of network device used. For example, with an Asynchronous Transfer Mode (ATM) switch, the version of the software may include information relating to the name of the system, the Internet Protocol address of the system, information about permanent connections through the switch, which versions of the protocols to employ, the various ports of the switch and the percentage of bandwidth to allocate for various traffic categories. In some network device systems, manually assigned system resources may need to be entered by the user into an operating system configuration database 240 to enable the operating system to function with the peripherals. If these input values are incorrectly entered, system faults can occur. For example, a peripheral device may be unavailable to application programs or the computer system may fail to execute programs properly.

The operating system 230 establishes an application environment 210 in which applications 211–214 can execute. The applications 211–214 can implement network device operations such as routing, bridging and filtering. In various implementations, applications 211–214 may execute independently as separate tasks in a multiprocessing computer system and may occupy separate memory spaces. Applications 211–214 may require particular physical resources 201 to function. For example, a bridging or gateway application may require access to a pair of network adapters 112 and 114 (FIG. 1) so that a connection to a pair of networks can be established. The network adapters may implement, for example, a token ring, Ethernet, ATM or other network access protocol. Applications 211–214 can obtain access to required resources using software function calls provided through the operation system's application program interface 290.

Implementations of the invention can facilitate the loading of a new version of software, enable the testing of the new version, and accept or reject the new version of the software. Implementations can also include a fall-back mechanism which restores the old version of the software if the new version fails to operate.

In an embedded system, such as a bridge, router, or gateway, configuration data is frequently stored in "flash memory". Flash memory is a type of alterable non-volatile memory. Examples of flash memory components used in an implementation of the invention are, but not limited to, the Intel StrataFlash DA28F640J5-150 or the Advanced Micro Devices AM 28 F020-200JC. In conventional flash memory implementations, it is possible to change individual 1-bit values to 0-bit values. However, changing the bit values from "0" to "1" may require an entire flash memory block to be reset, destroying all data in it. This limitation makes it advantageous to store one version of software in one section of memory and another version of the software in another region of memory. One of the versions is an old version which is known to be working. The other version is a new version to be tested. If the new version does not work, the old version can be recalled and reloaded. If the new version does work, the old version can be written over, all bits at once.

Referring now to FIG. 2B to aid the testing of a new version of software in an embedded device, the device may provide a region of memory containing the two versions 205, 208 of the software. One version is the old current version, and the other is a new version to be tried out in the system. Each version is assigned a status word indicating whether or not it is the new (and possibly a test version) or old version. (More detail of status words is discussed below.) The new version of software to be tested is read by the BIOS and initialization routines 202 to configure either a portion of the device 100 or the entire device 100 in FIG. 1.

Each of the versions 205, 208 of software is called a software image and may be assigned to a special section of memory. When the system a encounters "test" status word during start-up, it will use the image of the software that is stored with the "test" status word. Thereafter, unless the user explicitly accepts the new (non-current) image of the software, the old (current) image from the other portion of the special section in the memory region will be used the next time the system restarts. This feature is advantageous because if the system does not work well or is non-responsive, there is a fall-back feature to reload the old and working image of the software.

Figure 2C:
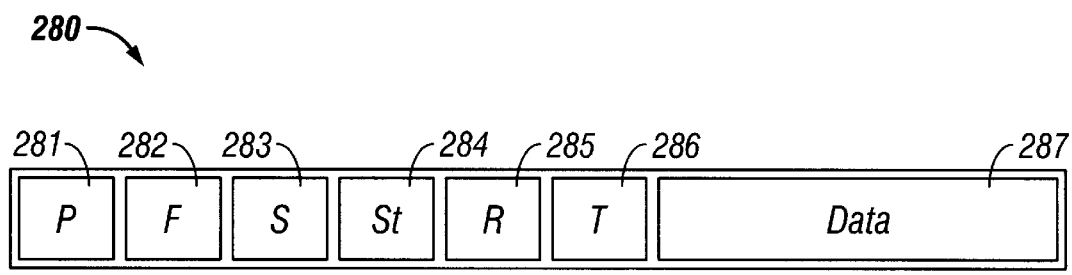
FIG. 2C is a data structure storing version information.

Referring now to FIG. 2C, a version of the software in memory is shown. (Two images of the software may be stored in flash memory.) The following table lists the protocol used for the first few bytes of the flash memory area in an implementation:

| Offset | Field Size (Bytes) | Description |
| --- | --- | --- |
| 0 | 2 | purpose |
| 2 | 2 | Flash Layout Version |
| 4 | 4 | Total size of Section |
| 8 | 2 | Status Word |
| 10 | 2 | Reserved |
| 12 | 4 | Date/Time |

The memory region includes the purpose 281 of the image of software, the flash layout format 282 of the image, the total size 283 of the used flash memory section, the status word 284 associated with the image, a reserved section 285, a date/time section 286, and the image data 287 itself. The purpose section 281 indicates the purpose of that particular section of memory. In an implementation, a hexadecimal ("hex") number 11 is set and means "software image". The format 282 indicates the version of the flash layout that is currently under use. The total size 283 indicates the amount of memory the image occupies. The status word 284 describes the state of the software, as is described in detail below. In an implementation, the time/date section 286 is the time when the flash memory section was written, measured in seconds since Jan. 1, 1970 at 00:00:00 GMT.

As noted above, two images (typically, the current image and the new image to be tested) of the software image are stored in the network device 100. Each software image is downloaded, for example, using Network Adapters 112 and 114, or from disk 113. Associated with each software image is the status word 284 stored in non-volatile memory 122. The status word may, for example, take on any of three values or states: Current, Test, or Non-Current. In this example the four permissible states for the two software images are listed in the following table:

| State | Image 1 | Image 2 |
|---|---|---|
| 1 | Current | Not-Current |
| 2 | Current | Test |
| 3 | Not-Current | Current |
| 4 | Test | Current |

Under normal operation, the system will have one image in state "current", and a second image in state "Not-Current", (states 1 and 3). When a new version of software is to be tested, it can be downloaded to the "Not-Current" image and the associated status word can be set to the "Test" state. (states 2 and 4). Once the new version is loaded, it may then be tested. In an embodiment, the status words associated with each individual image are stored as hex numbers in flash memory. The following table lists hex numbers associated with status words:

| Value (hex) | Meaning |
|---|---|
| FFFF | Unused Flash Memory Section |
| 7F7F | Not Current |
| 3F3F | Test |
| 1F1F | Not Current |
| 0F0F | Current |
| 0707 | Not Current |
| 0303 | Current |
| 0101 | Error in Flash Memory |
| 0000 | Unused Flash Memory Section |

There are several encodings with the same meaning. This repetition is a result of flash memory technology which only allows a 1-bit to be changed to a 0-bit, not the other way round as indicated above. Thus it is possible for example, to change 0F to 07, but not to 1F. Thus if a status word is to go through the following state changes: "Not current"->"Current"->"Not Current"->"Current", this can be accomplished by using the status word values: 1F1F->0F0F->0707->0303.

Under normal operation, the system will have one software image with a status word "Current", and one image with a status word of "Not Current". The image with the status word "Current" is the present version that is operational and that the system normally loads upon start up.

Figure 3A:
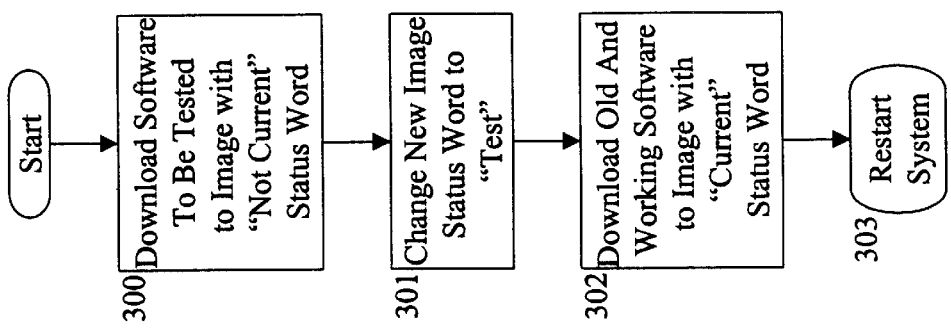
FIG. 3A is a flow chart depicting operation of the network system.

If a user wishes to try a new version of the software, certain steps are necessary to ensure that the operational version is stored in flash memory in the event that the new version is non-operational or renders the system non-functional. This preparation provides a fall-back mechanism. Referring now to FIG. 3A, a flow chart depicting the steps a user takes in preparing a new version of software for testing in a network device 100 (FIG. 1) is shown. The special region in memory as discussed above has an associated status word of "Not Current". A user first downloads the image to be tested to this region in flash memory at step 300. The user then changes the status word in that "test" region to "Test" at step 301. The present operation al software is download to a region in flash memory with an associated status word, "Current" at step 302. The system is then restarted at step 303.

Figure 3B:
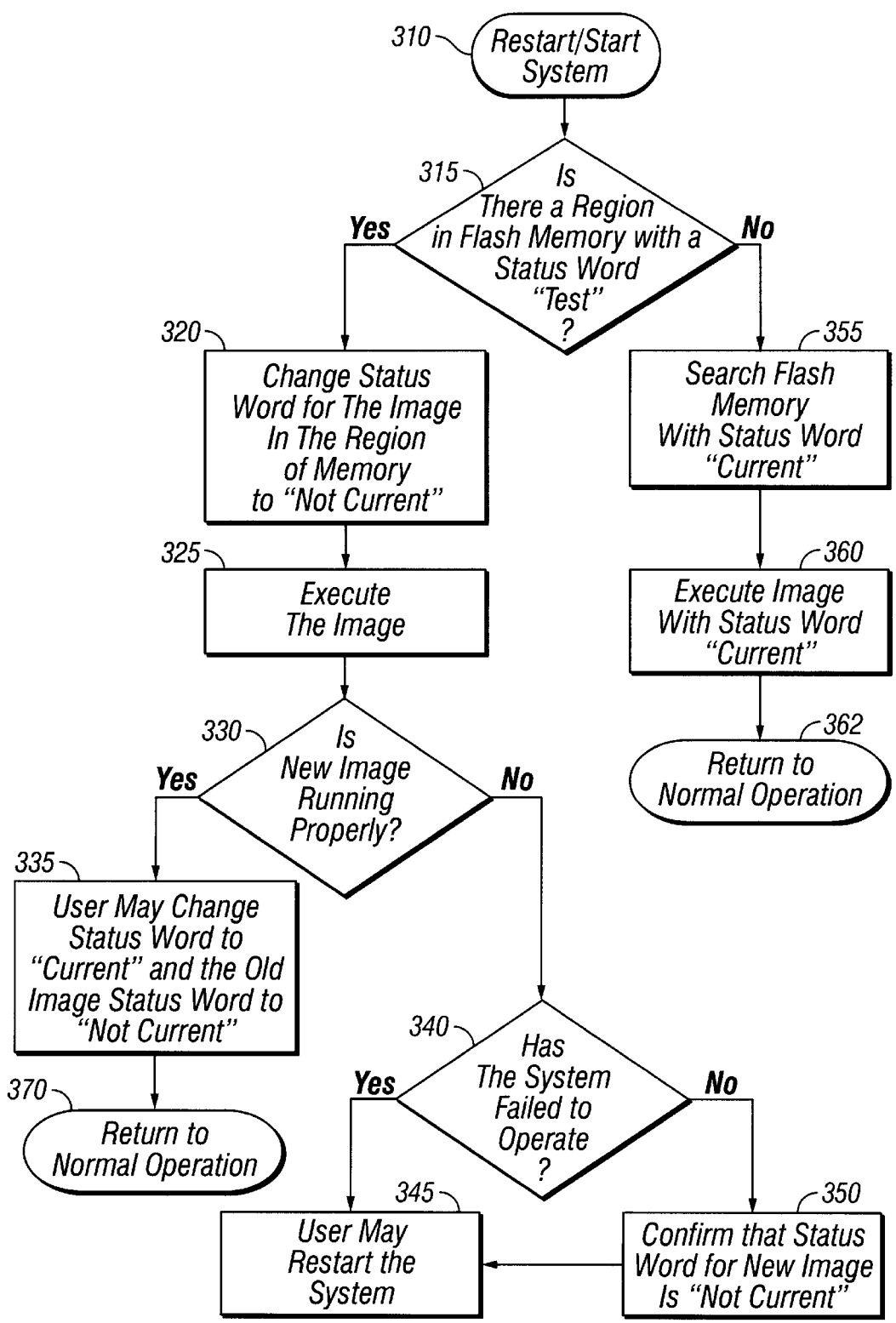
FIG. 3B is a flow chart depicting further operation of the network system.

FIG. 3B, depicts a flow chart showing how the network device searches flash memory for a "test" image upon the restart of the network device in step 303 (FIG. 3A), and the execution resulting therefrom. Note that FIG. 3B also covers the case of a normal device power-up. When the system is restarted (or started), the system searches for a region in flash memory that has a status word of "Test" at 315. If there is a region in memory with the "test" status word, the status word is changed to "Not Current" at step 320. As discussed above with respect to FIG. 3A, that image corresponds to a version of software that is to be tested. The image found in that region of memory is chosen for execution at step 325. After the image is executed the system may or may not be running properly at step 330. If it is running properly then the user decides if he wants to maintain that version of the software. If the user wants to keep that version of the software he changes the status word associated with that image to "Current" and changes the status word of the old version to "Not Current" at step 335. The user can then return to normal operation at step 370.

In the situation where there is no "test" image, such as a normal start up of the system, the system will find no "Test" status word in flash memory at step 315. The system then searches for the region in memory for a status word "Current" which corresponds to a version of software that is operational at step 355. The system then executes that image at step 360 and return to normal operation at step 362.

If the system is not operating properly with the new software at step 330, it is determined whether the system is still operable at step 340. If the system fails to operate rendering the user interface inoperable or non-responsive, the user merely restarts the system at step 345. In this way, a test software image which has been used once and not explicitly accepted by the user (by changing its status word to "Current") will be automatically disabled. If the system is responsive the user confirms that the status word is "Non-Current" at step 350, then restarts the system at step 345.

When the system restarts at 310, the system does not find a status word "Test" therefore it searches for the region of memory with the status word "Current at step 355". The system then executes the image with the status word "Current" which as discussed above is the old operation version of software that was downloaded to the image with status word "Current" (FIG. 3A, step 302).

Images with the status word "Not Current" are ignored by the system. Therefore by changing the status word of a image of software that is to be tested from "Test" to "Not Current" prior to its execution, and setting the status word of a image of software known to be operational to "Current", a user is guaranteed to have a fall-back to the old image if the new image fails to operate. By changing the status words after the test software is found satisfactorily operational, the new software is enabled and the old software is disabled. If at a later stage, it is discovered that the new software is not operating properly or is otherwise undesirable, the user may change the state of the software images (by changing the respective status words) to re-enable the old image and disable the new image.

By storing both the old (working) and the new (possibly not working) versions of the software, the system may be tested by running the new software, with an automatic fall-back mechanism being provided in the event that the new software fails to function.

The new image may be tested again by simply changing its status word back to "Test" prior to restarting the system.

Figure 4A:
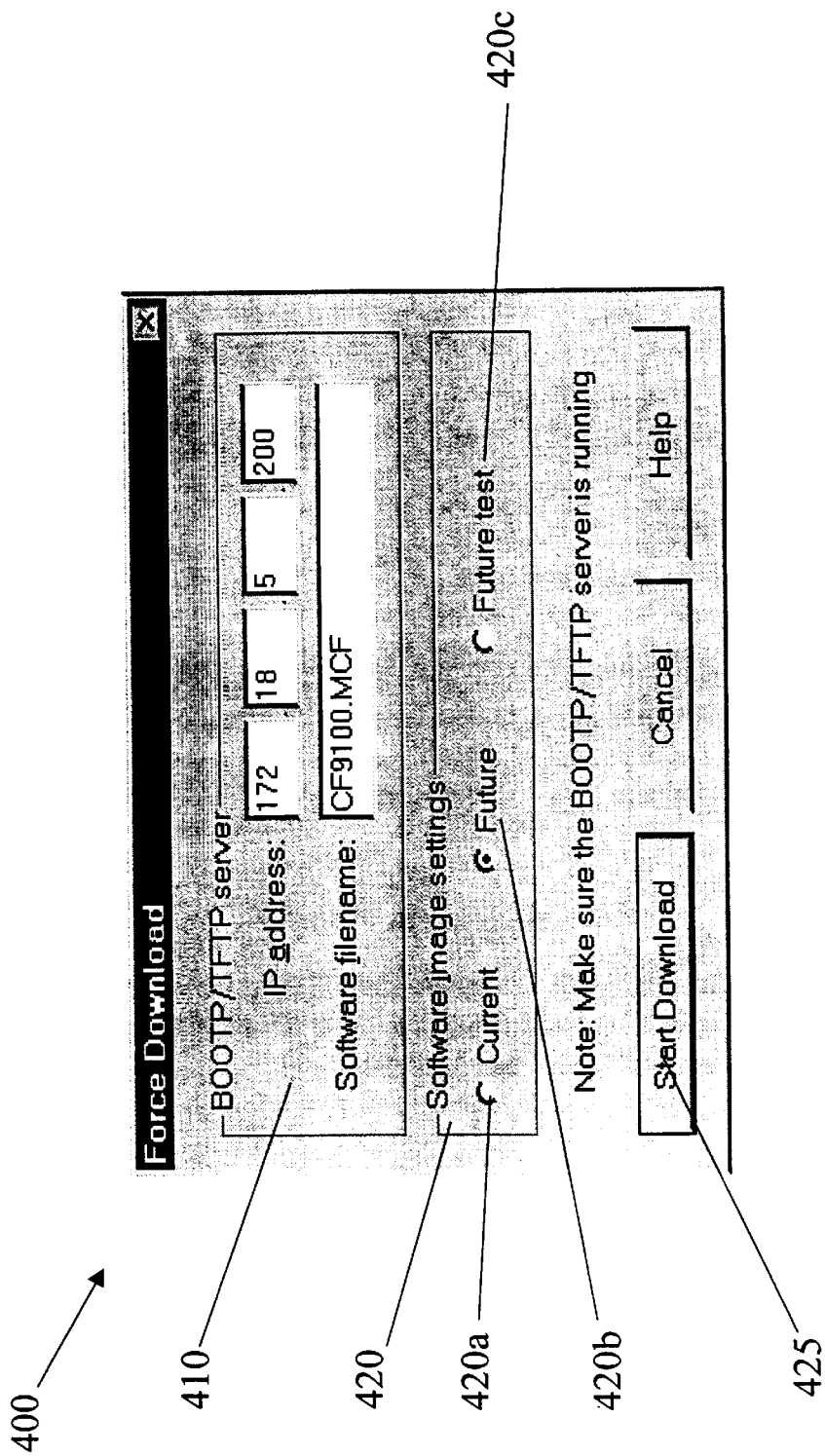
FIG. 4A illustrates a screen shot of an implementation of a Graphical User Interface which allows a user to download software versions into software images.

FIG. 4A depicts a screen shot 400 of an implementation of a Graphical User Interface (GUI) in which a user can load versions of software into images for testing. The GUI is used to locate a file name of a version of software located at a particular IP address using control 410. The status word of the image is set using control 420. As discussed above the possible states for the software image are "Current" 420*a*, "Not Current" (shown in the figure as "Future" 420*b*), and "Test" (shown in the figure as "Future test" 420*c*). Once the user has determined the status word for the version of software, he can download it to the image with associated status word by depressing the download button 425.

Figure 4B:
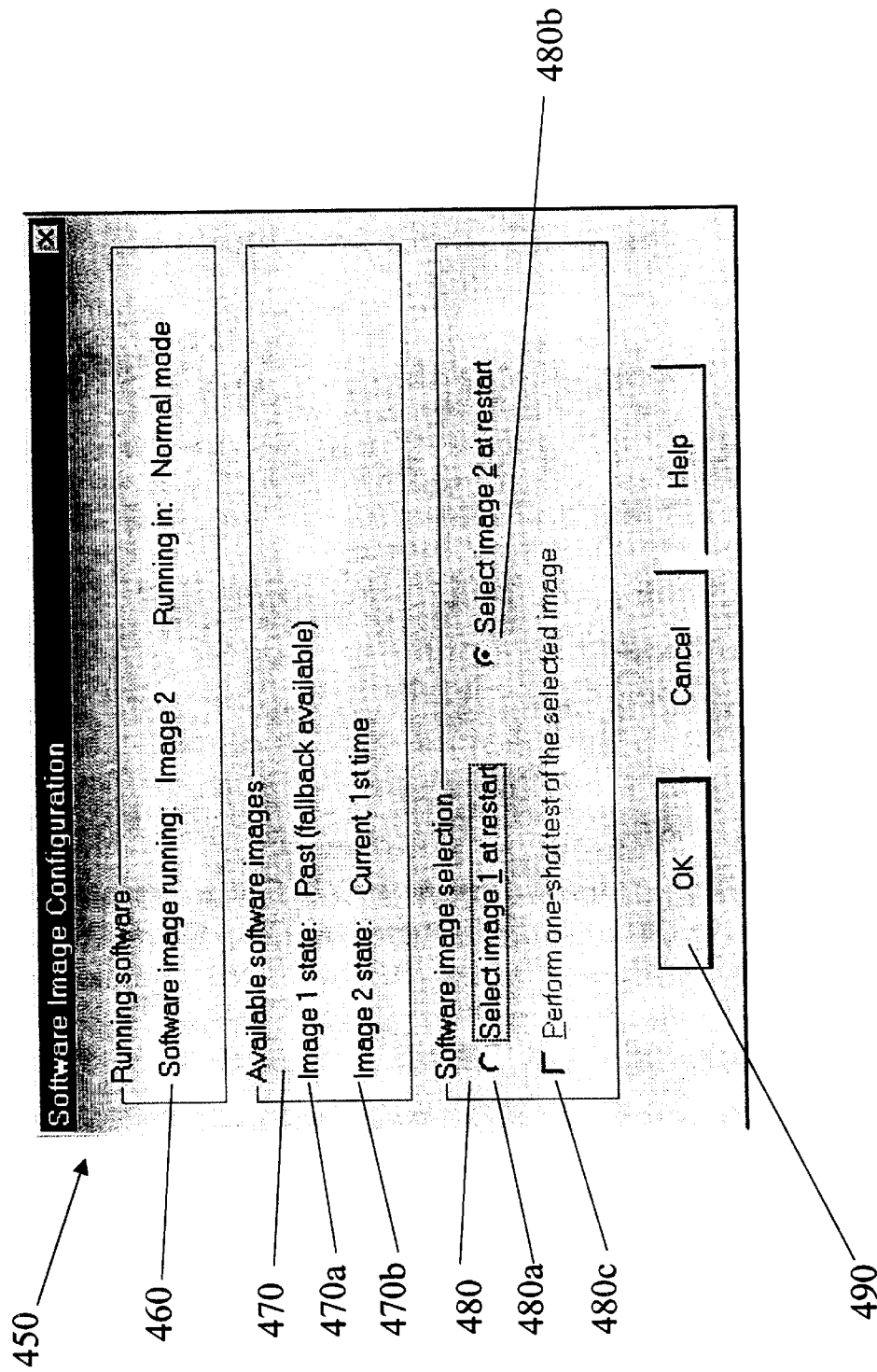
FIG. 4B is a screen shot of an implementation of a Graphical User Interface that allows a user to change the status words associated with software images.

Once it is determined that either the software image is running properly or not running properly, the status word can be changed by the user. FIG. 4B depicts a screen shot 450 of an implementation of a GUI that allows a user to change the status word associated with a software image. The GUI includes a Running software status box 460 indicating the image of the software running. "Normal mode" simply refers to the normal operation of the software. The GUI also includes an Available software images status box showing the available software images. The states of images 470*a*, 470*b* are shown. In the figure, the first image 470*a* is shown in the "Not-Current" state (shown as "Past (fallback available)"), and the second image 470*b* is shown in the "Current" state. It is noted that image 1 470*a* is still stored in flash memory and is capable of being recalled simply by changing the status words as discussed above. The status words may be changed in software image selection box 480. The user has the choice of selecting either image 1 480*a* or image 2 480*b* at restart. By selecting either of the software images 480*a*, 480*b*, the user is setting the status words to "Not Current" and "Current" respectively. The Software image selection box 480 also has the option of setting the status word to "Test" 480*c* for the selected software image for running a test. The user accepts and effects the changes to the status words by depressing the "OK" button 490.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high level procedural or object-oriented programming language, or in assembly or machine language if desired; and in any case, the language may be a compiled or interpreted language. Suitable processors include, by way of example, both general and special purpose microprocessors. Generally, a processor will receive instructions and data from read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing may be supplemented by, or incorporated in, specially-designed ASICs (application-specific integrated circuits).

What is claimed is:

1. A method for testing software in a device, comprising:
   initializing the device;
   storing at least two software images in a memory in the device;
   providing status information to indicate a state of each software image in said memory, the state of each software image being one of current, not-current or a test version;
   selecting one of the software images for execution if the state indicates the one of the software images is said test version;
   changing the status information for the selected software image prior to execution of the selected software image to a state of not-current if the selected software image is the test version; and
   executing the selected software image without an automatic reboot if the selected software image fails.

2. The method of claim 1 wherein selecting one of the software images for execution comprises selecting another of the software images for execution if the status information indicates none of the software images are a test version and the another of the software images is a current version.

3. The method of claim 1 further comprising:
   determining whether the device is operating properly.

4. The method of claim 3 further comprising:
   changing the status information of the selected software image from indicating that the selected software image is not-current to status information that indicates that the selected software image is current if the device is operating properly, and changing the status information of a second of the software images to a status information indicating that the second software image is not-current.

5. The method of claim 3 further comprising:
   maintaining the status information of the selected software image if the device is not operating properly; and
   reinitializing the device.

6. The method of claim 1 wherein the software images and status information are stored in a non-volatile memory, the non-volatile memory comprising a plurality of bit value locations, the bit value locations being independently addressable when changing state between a first state value and a second state value, and the bit value locations being addressable members of an interdependent plurality of locations when changing state between the second state value and the first state value.

7. The method of claim 4 wherein the software images and status information are stored in a non-volatile memory, the non-volatile memory comprising a plurality of bit value locations, the bit value locations being independently addressable when changing state between a first state value and a second state value, and the bit value locations being addressable members of an interdependent plurality of locations when changing state between the second state value and the first state value.

8. The method of claim 7 wherein changing the status information comprises altering a bit value location between the first state value and the second state value.

9. A method of managing images of software in a device, comprising:
   storing at least two images of software in a memory in the device;
   storing status records in the memory, wherein the status records indicate the operating mode of the software, including whether one of the software images is a test image;

selecting the test image for execution;

altering the status records to indicate an attempt to establish device operation with the selected image of software and to indicate that the selected image is no longer designated as a test image; and executing the selected image without an automatic reboot if the selected image fails.

10. The method of claim 9 further comprising:

establishing device operation;

indicating whether the operational image of software is to be accepted;

selectively altering any status records necessary to indicate whether the selected version is to be accepted.

11. A computer program residing on a computer-readable medium comprising instructions for causing a computer to store at least two images of software in a memory in the device;

store a status record for each image in the memory, wherein the status records indicate the operating mode of the associated software image, including that one of the software images is a test image;

select the test image for execution;

alter the status records to indicate an attempt to establish device operation with the selected image of software and to indicate that the selected image is no longer designated a test image; and execute the selected image without an automatic reboot if the selected image fails.

12. The computer program of claim 11 further comprising instructions to:

establish device operation;

indicate whether the operational image of software is to be accepted; and selectively alter status records to indicate whether the selected image is to be accepted.

\* \* \* \* \*